(12) United States Patent
Bechtel et al.

(10) Patent No.: US 12,358,431 B2
(45) Date of Patent: Jul. 15, 2025

(54) STOWABLE VEHICLE LADDER

(71) Applicant: FCA US LLC, Auburn Hills, MI (US)

(72) Inventors: Travis D Bechtel, Goodrich, MI (US);
Richard T Stuedemann, Ortonville, MI (US); Stacey L Berger, Lapeer, MI (US)

(73) Assignee: FCA US LLC, Auburn Hills, MI (US)

( * ) Notice: Subject to any disclaimer, the term of this patent is extended or adjusted under 35 U.S.C. 154(b) by 359 days.

(21) Appl. No.: 18/162,753

(22) Filed: Feb. 1, 2023

(65) Prior Publication Data
US 2024/0253570 A1    Aug. 1, 2024

(51) Int. Cl.
*B60R 3/02* (2006.01)
*B60R 3/00* (2006.01)

(52) U.S. Cl.
CPC .............. *B60R 3/02* (2013.01); *B60R 3/005* (2013.01)

(58) Field of Classification Search
CPC ........... B60R 3/02; B60R 3/006; B60R 3/002; B62D 33/027; E06C 1/38; E06C 5/00; E06C 5/30
See application file for complete search history.

(56) References Cited

U.S. PATENT DOCUMENTS

| | | | |
|---|---|---|---|
| 5,039,119 A * | 8/1991 | Baughman | B60R 3/005 182/127 |
| 6,170,843 B1 * | 1/2001 | Maxwell | B60R 3/02 280/166 |
| 6,640,929 B2 * | 11/2003 | Korpi | E06C 5/02 182/127 |
| 6,942,271 B1 * | 9/2005 | Jamison | B60R 3/007 296/61 |
| 7,219,941 B1 | 5/2007 | Paolo et al. | |
| 7,422,263 B2 * | 9/2008 | Pritchard | B60R 3/02 280/166 |
| 7,661,693 B1 * | 2/2010 | Lipski | B60R 9/06 280/166 |
| 7,740,260 B2 | 6/2010 | VanBelle et al. | |
| 7,823,896 B2 | 11/2010 | VanBelle et al. | |
| 8,251,387 B2 * | 8/2012 | Gansberger | B60R 3/007 280/166 |
| 8,919,853 B2 | 12/2014 | Krishnan et al. | |
| 9,487,148 B2 * | 11/2016 | Kichline, Jr. | B60R 3/02 |
| 9,840,201 B2 * | 12/2017 | Knodle | B60R 3/007 |
| 10,173,595 B1 * | 1/2019 | Ulrich | B60R 3/02 |
| 10,814,790 B2 * | 10/2020 | Meszaros | B60R 3/02 |
| 11,951,946 B2 * | 4/2024 | Stevenson | B60R 3/005 |
| 2021/0086702 A1 | 3/2021 | Christensen et al. | |
| 2021/0146842 A1 | 5/2021 | Niemela et al. | |
| 2024/0101032 A1 * | 3/2024 | Ebbenga | E06C 7/182 |

FOREIGN PATENT DOCUMENTS

| AT | 520934 B1 * | 9/2019 | ............... B60R 3/02 |
| CN | 107512227 A * | 12/2017 | ............... B60R 3/02 |

* cited by examiner

*Primary Examiner* — Steve Clemmons
(74) *Attorney, Agent, or Firm* — Jeremy J. Klobucar

(57) ABSTRACT

A stowable ladder for a vehicle includes a base, a support, at least one step and a retainer. The base may be rotatably coupled to the vehicle, the support is coupled to the base at a first pivot, and at least one step is coupled to the support. The support is movable about the first pivot so that the ladder can be arranged in a folded position and an unfolded position. The retainer selectively prevents and permits rotation of the base from a stowed position to an extended position.

18 Claims, 7 Drawing Sheets

STOWABLE VEHICLE LADDER

FIELD

The present disclosure relates to a ladder for a vehicle that, in at least some implementations, may be stowed under the vehicle when not in use.

BACKGROUND

Some vehicles include areas difficult to reach by a person standing on the ground, like a cargo area, roof or the like. When a person attempts to reach such areas, the person may contact the exterior of the vehicle and get dirty or their clothing may scratch the exterior of the vehicle. Further, some people may use a vehicle wheel or another portion of the vehicle as a step to increase their reach, and such areas may be difficult to stand on, and may put the person in contact with the vehicle exterior, as noted.

SUMMARY

In at least some implementations, a stowable ladder for a vehicle includes a base, a support, at least one step and a retainer. The base has an upper surface and a mount adapted to be coupled to a vehicle and defining an axis of rotation of the base, wherein the axis of rotation of the base is perpendicular to the upper surface of the base and the base rotates about the axis of rotation between an extended position and a retracted position. The support is coupled to the base at a first pivot, and at least one step is coupled to the support. The support is movable about the first pivot between a folded position and an unfolded position, wherein the axis of rotation of the support about the first pivot is perpendicular to the axis of rotation of the base and the at least one step is farther from the base when the support is in the unfolded position than when the support is in the folded position. The retainer has a first position in which the retainer overlaps one or both of the base and the support in a path of rotation of the base to prevent rotation of the base from the retracted position to the extended position, and the retainer has a second position in which the retainer does not overlap either the base or the support in the path of rotation of the base so that the base is rotatable from the retracted position to the extended position.

In at least some implementations, the support includes a first section and a second section coupled to the first section at a second pivot, and the axis of rotation of the second section about the second pivot is parallel to the axis of rotation of the first section. In at least some implementations, the first section rotates in a first direction when the support is moved from the folded position to the unfolded position, and the second section rotates in the first direction when the support is moved from the folded position to the unfolded position. In at least some implementations, when the support is in the folded position, the second section is located beneath the first section, and when the support is in the unfolded position, the second section is above the first section, where above and below are relative to a ground surface that is below the base.

In at least some implementations, the ladder includes a first step and a second step, and when the support is in the unfolded position, the first step is between the upper surface of the base and the second step. In at least some implementations, the first step is carried by the first section and the second step is carried by the second section.

In at least some implementations, when the support is in the unfolded position, part of the second section overlaps part of the first section and a ladder retainer is carried by either the first section or the second section. The ladder retainer is securable to the other of the first section and the second section to inhibit pivoted movement of the second section relative to the first section.

In at least some implementations, the ladder includes a ladder retainer carried by the base. The ladder retainer is movable relative to the support from a secured position in which movement of the support about the first pivot is inhibited to an unsecured position in which the support may be more freely moved about the first pivot.

In at least some implementations, the ladder also includes a spring that yieldably biases the base toward the extended position. This may facilitate release of the base from the retainer.

In at least some implementations, the retainer includes a latch having a pivot about which the latch rotates, and the retainer includes a first link and a second link, with the second link coupled to the first link by a pivot and having a free end that extends outwardly from the first link and into the path of travel of the base when the latch is in a retaining position. The second link rotates relative to the first link and away from the retaining position to a release position to permit the base to rotate to the extended position.

In at least some implementations, the latch includes a link having a first end and a second end, and the latch rotates about a latch pivot located between the first end and the second end. The retainer includes a latch body carried by the base so that the latch body rotates relative to the link when the base rotates, and the latch body includes a notch that releasably receives the first end of the link to define the first position of the retainer. In at least some implementations, the ladder includes a release that is selectively engageable with the link to move the retainer to the second position by rotating the link about the latch pivot to remove the first end of the link from the notch.

In at least some implementations, a stowable ladder for a vehicle, includes a base, a support and a retainer. The base has an upper surface and a mount defining an axis of rotation of the base, wherein the axis of rotation of the base is perpendicular to the upper surface of the base and the base rotates about the axis of rotation between an extended position and a retracted position. The support has a first section that is coupled to the base at a first pivot, and the support has a second section that is coupled to the first section at a second pivot that is spaced from the first pivot. The support also has a folded position in which the first section and second section are overlapped with each other and arranged near the base, and the support has an unfolded position in which the first section extends away from the base at an angle of between 45 degrees and 90 degrees relative to the upper surface, and the second section is parallel to the first section or within 30 degrees of parallel to the first section, and wherein the support includes at least one step that is spaced from the upper surface of the base when the support is in the unfolded position. The retainer has a first position in which the retainer overlaps one or both of the base and the support in a path of rotation of the base to prevent rotation of the base from the retracted position to the extended position, and the retainer has a second position in which the retainer does not overlap either the base or the support in the path of rotation of the base so that the base is rotatable from the retracted position to the extended position.

In at least some implementations, the axis of rotation of the second section about the second pivot is parallel to the axis of rotation of the first section about the first pivot. In at least some implementations, the axis of rotation of the first section about the first pivot is perpendicular to the axis of rotation of the base.

In at least some implementations, the ladder includes a second retainer that engages a stop surface when the base is in the extended position to releasably retain the base in the extended position.

In at least some implementations, when the support is in the unfolded position, part of the second section overlaps part of the first section and a ladder retainer is carried by either the first section or the second section. The ladder retainer is securable to the other of the first section and the second section to inhibit pivoted movement of the second section relative to the first section.

In at least some implementations, when the support is in the folded position, the second section is located beneath the first section, and when the support is in the unfolded position, the second section is above the first section, where above and below are relative to a ground surface that is below the base.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
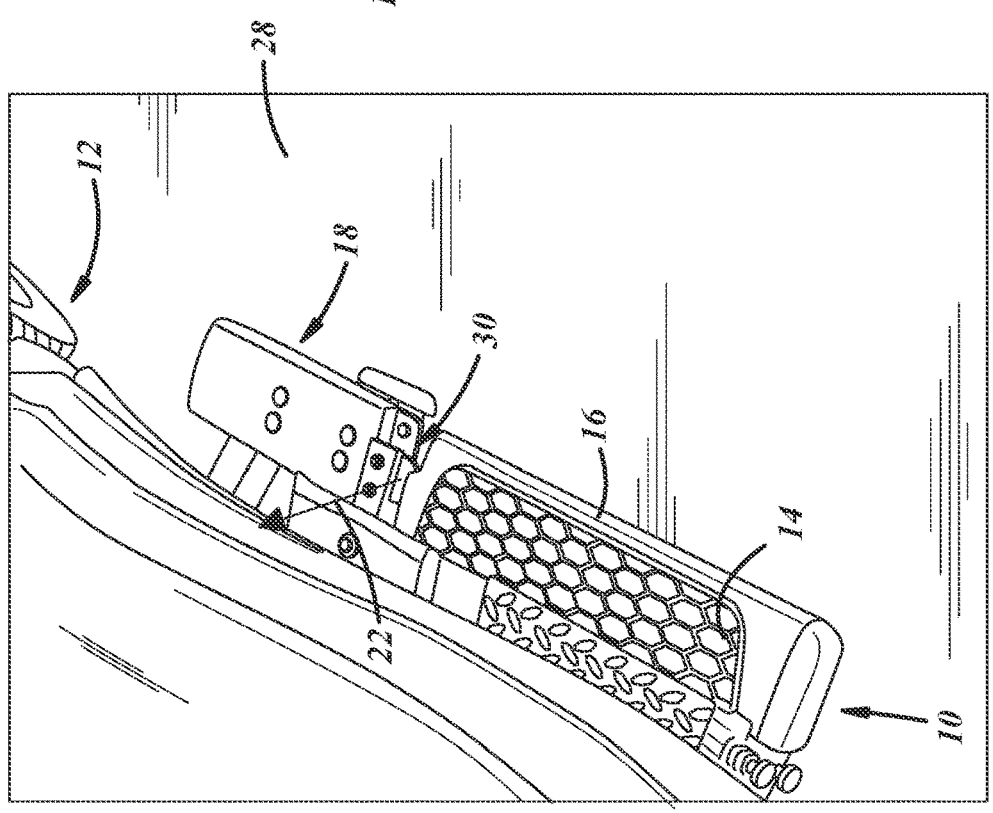
FIG. 1 is a fragmentary perspective view showing part of a side of a vehicle with a ladder shown in a retracted, stowed position.
Figure 6:
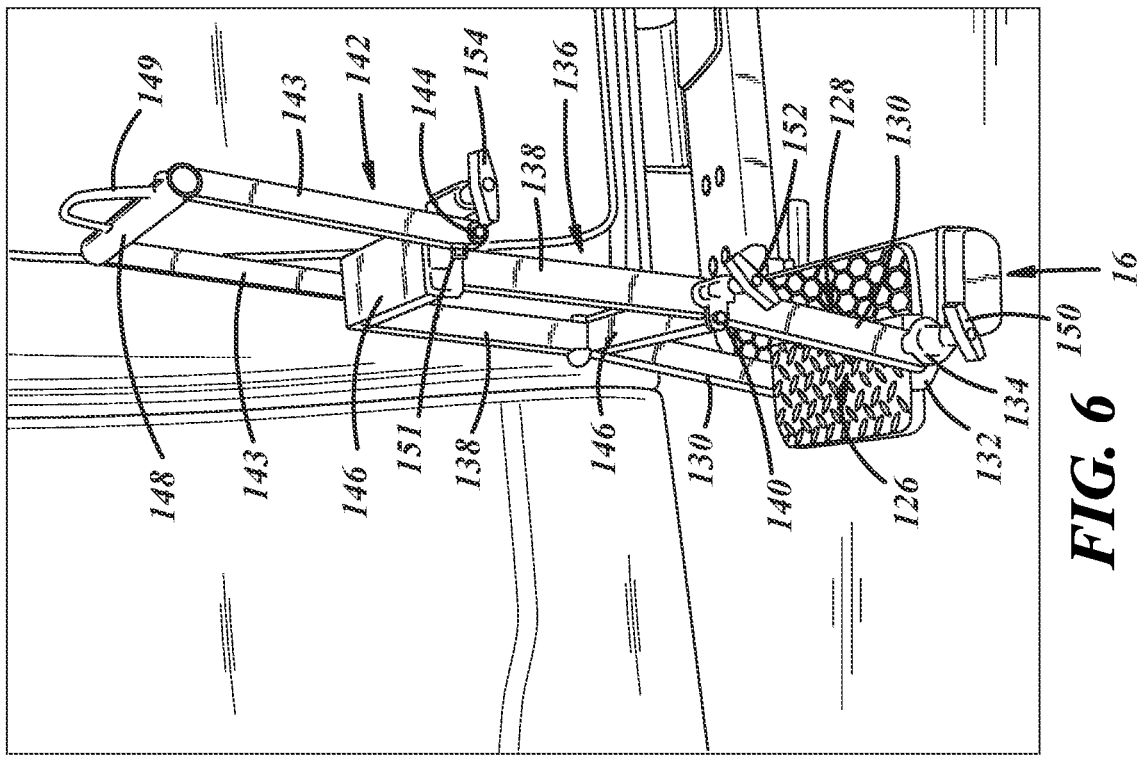
FIG. 6 is a side view of the ladder shown in the extended position.

Referring in more detail to the drawings, FIGS. 1-6 show a ladder 10 for a vehicle 12. The ladder moves or is movable between a retracted or stowed position (FIG. 1) and an extended or deployed position (FIG. 6). In the retracted position, the ladder 10 may be received beneath part of the vehicle 12, which may include a component connected to the vehicle 12 like a fixed side step such as a rail/tube or running board 18, for example, which are typically received adjacent the passenger compartment of the vehicle 12. In at least some implementations, the base 16 may be aligned with the running board 18 when in the stowed position and may define part of the running board, as shown in FIG. 1. That is, part of an upper surface 14 of the base 16 may define part of a running board or the like, if desired.

Figure 2:
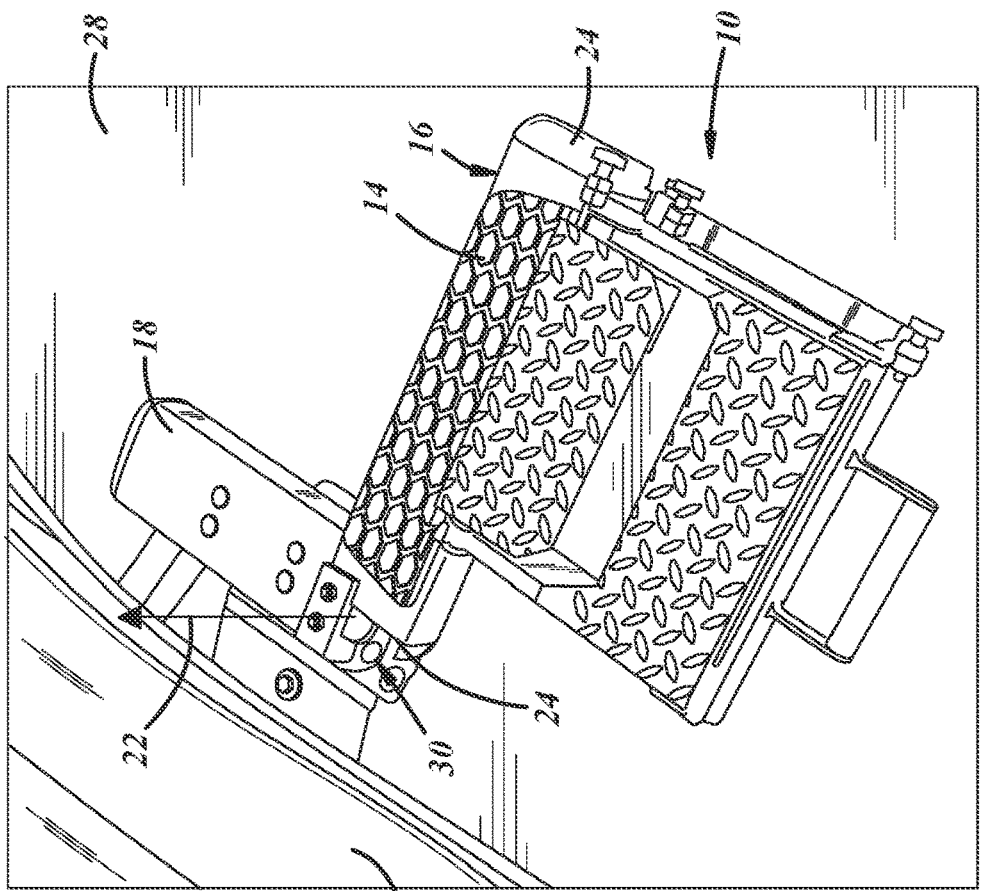
FIG. 2 is a view similar to FIG. 1 with the ladder in a deployed and folded position.
Figure 4:
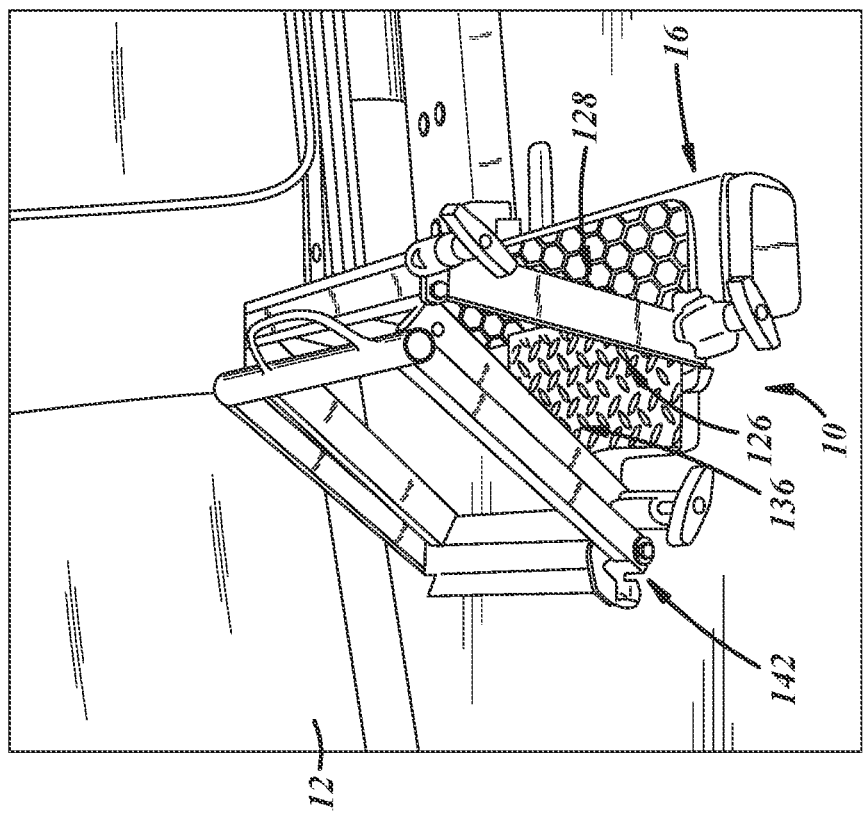
FIG. 4 is a side view showing the ladder in the process of being moved from the folded position to an extended position.
Figure 3:
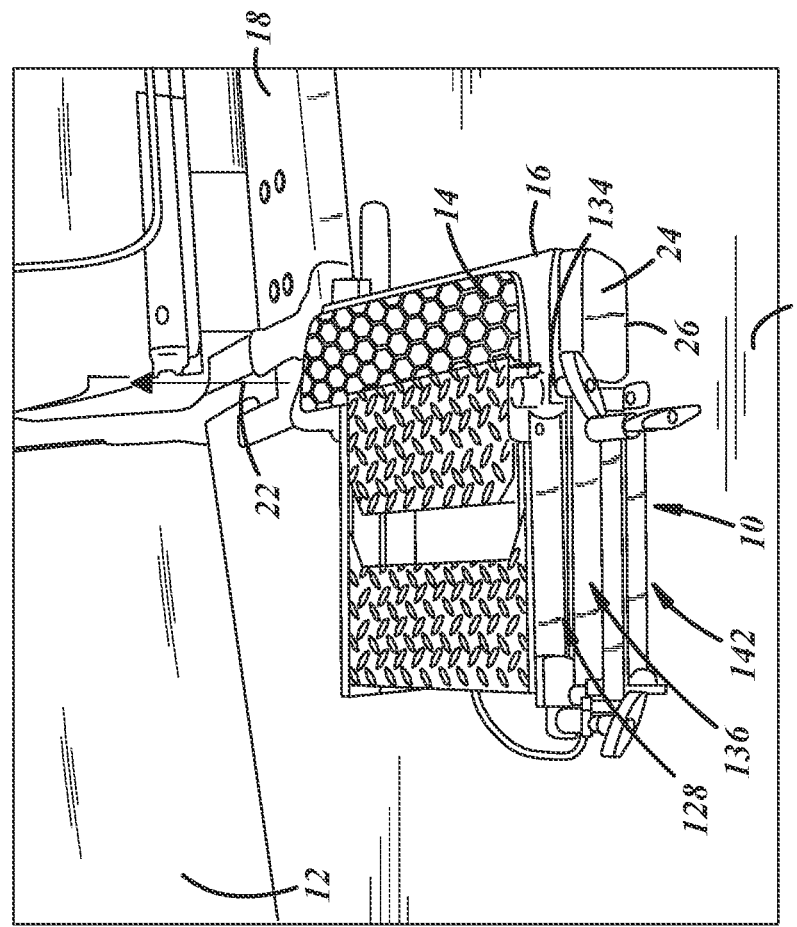
FIG. 3 is a side view showing the ladder in the deployed and folded position.
Figure 5:
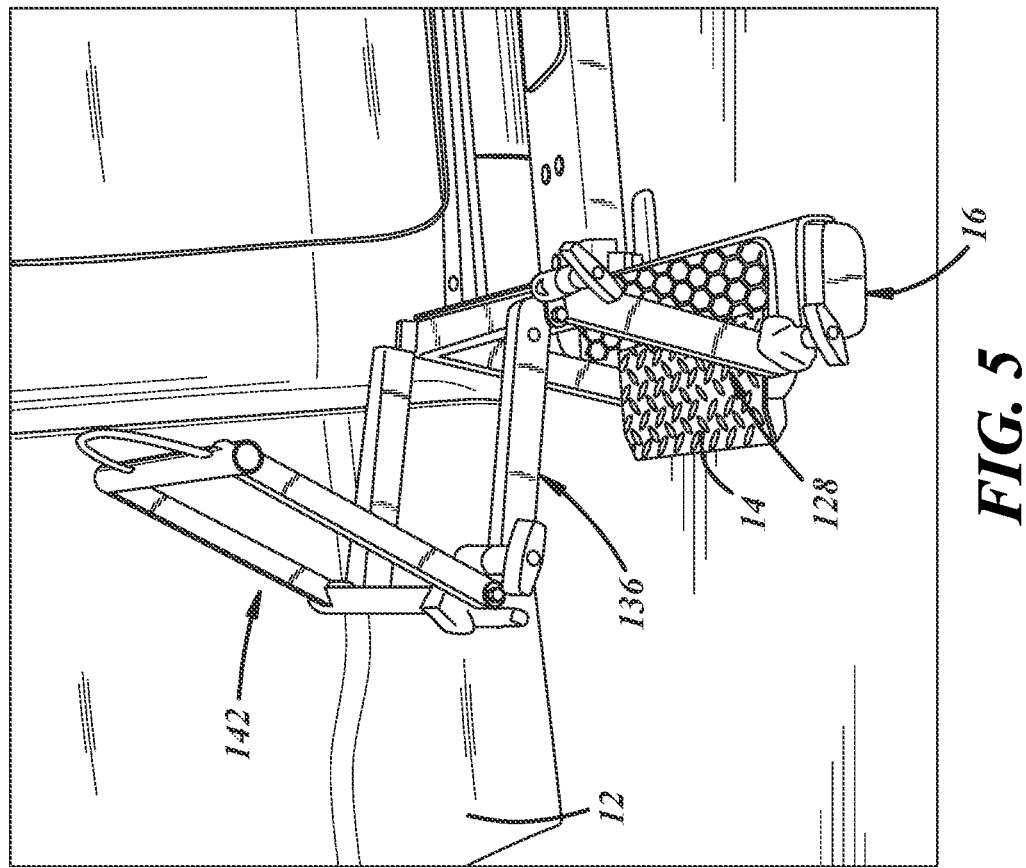
FIG. 5 is a side view showing the ladder further in the process of being moved from the folded position to an extended position.

In the extended position, as shown in FIGS. 2-6, the upper surface 14 of the base 16 of the ladder 10, and one or more vertically spaced steps of the ladder, are exposed in a cross-car direction (which is a direction between left and right sides of the vehicle) outboard of the vehicle 12. So arranged, a person may step up on the ladder 10 using the base 16 and steps to facilitate access to, for example, a roof top carrier, bike rack, or the like, or to facilitate access to the bed of a pickup truck. In the drawings, FIGS. 2 and 3 show the ladder in a fully folded position, FIGS. 4 and 5 show the ladder being unfolded and FIG. 6 shows the ladder fully unfolded, wherein the ladder extends away from the base 16 at an angle of between 45 degrees and 90 degrees relative to the upper surface 14 of the base 16.

In at least some implementations, the upper surface 14 of the base may be generally flat, and may be oriented upward, in the direction opposite to the direction of gravity, and may be perpendicular to the axis of rotation 22 of the ladder 10. The upper surface 14 may have any desired shape and may be sized for partial or full receipt of one foot or both feet of a user, as desired. The upper surface 14 may be defined by peripheral side surfaces 24 that extend between the upper surface 14 and a lower surface 26 (FIG. 3) that is opposite to the upper surface 14 and faces downwardly, toward the ground 28.

The ladder 10 also includes a mount 30 (labeled in FIGS. 1, 2, 7, 8 and 13) adapted to be coupled to the vehicle 12. In the example shown in FIG. 13, the mount 30 includes a shaft or pivot pin 32 coupled to or part of the base of the ladder so that the base 16 of the ladder 10 rotates about the axis 22 defined by the mount 30 (or by the shaft/pivot pin 32) between the extended and retracted positions. The mount 30 may include a bracket 34 coupled to the base 16 or be defined by an integral extension of the base 16, which is a portion extending laterally away from the base 16 and including a socket 38 (FIGS. 7, 8 and 13) for the pivot pin or shaft 32, or alternatively, including the pivot pin or shaft 32 which is received in a corresponding socket or bracket carried by/attached to the vehicle.

So arranged, the ladder 10 pivots or rotates about the axis 22 between the extended and retracted positions and the pin 32 rotates within the socket 38 and relative to the bracket 34. As the ladder 10 moves, the base 16 sweeps along a path of movement with the upper surface 14 remaining perpendicular to the axis of rotation 22 and generally parallel to a ground surface 28 on which the vehicle 12 is received.

Figure 7:
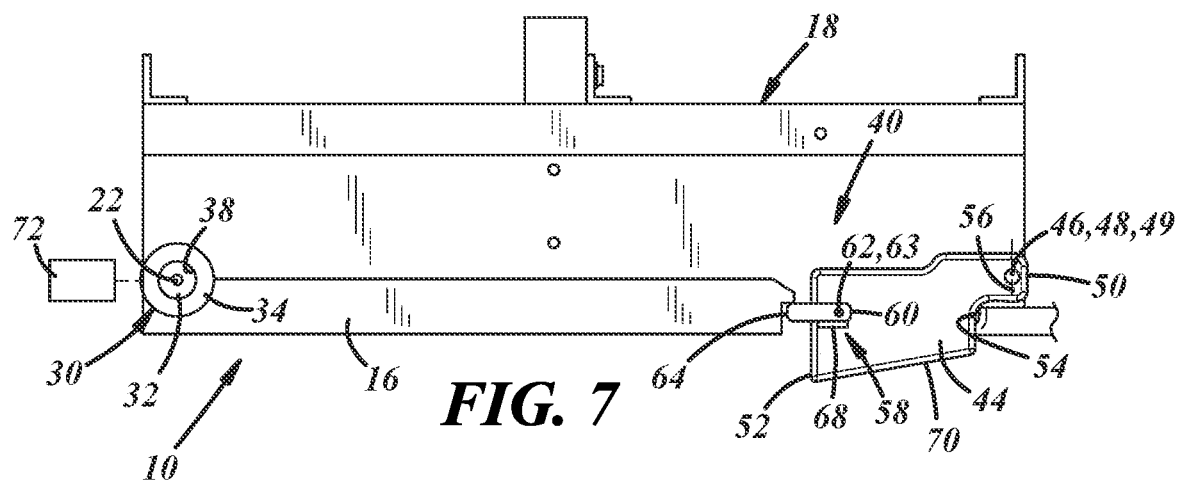
FIG. 7 is a diagrammatic view of a retainer arranged to releasably retain the ladder in the stowed position.
Figure 8:
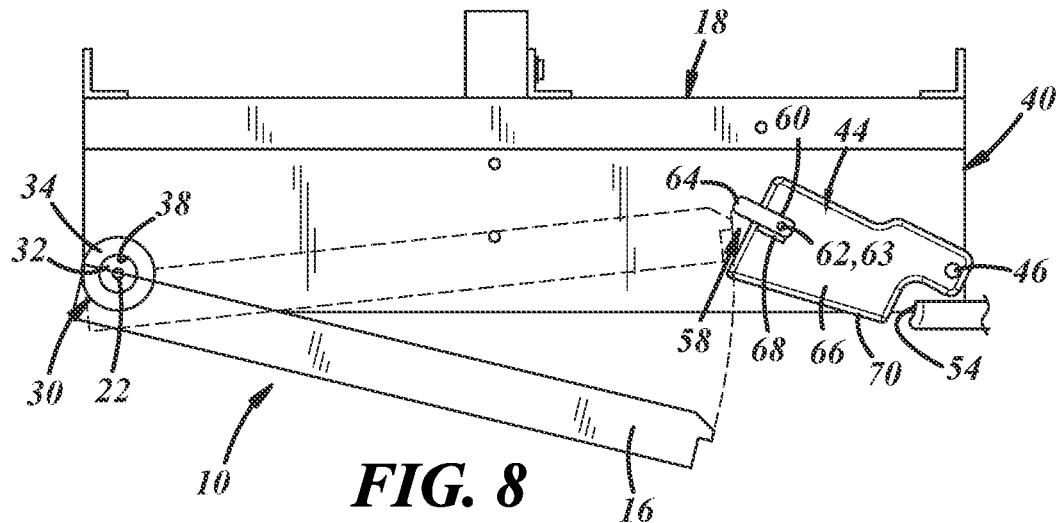
FIG. 8 is a view similar to FIG. 7, showing the retainer in a released position and the ladder rotating toward the deployed position.
Figure 9:
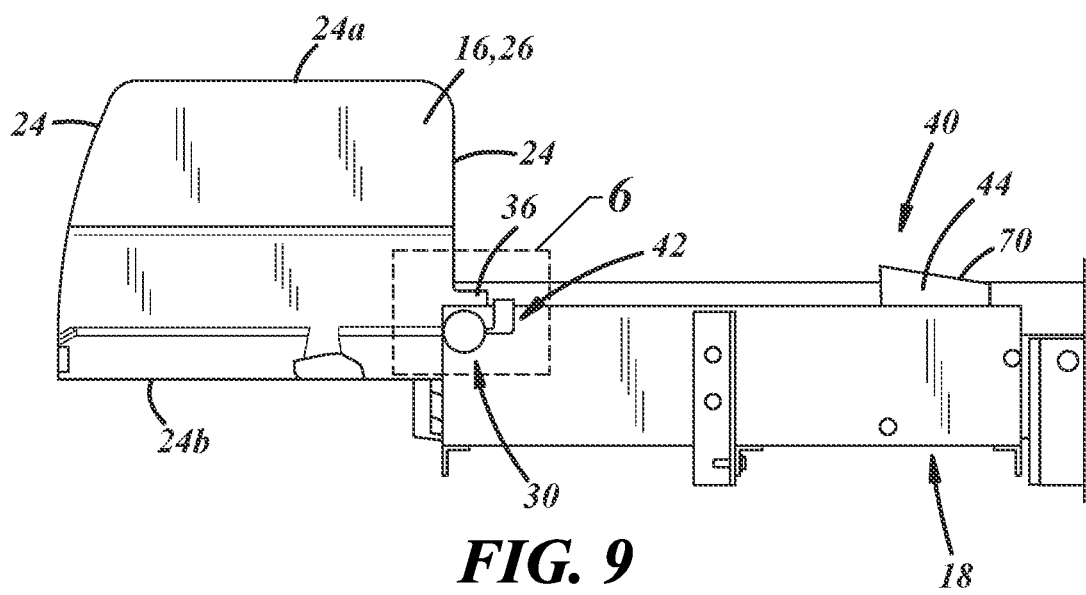
FIG. 9 is a bottom view of the ladder shown in the extended position.
Figure 13:
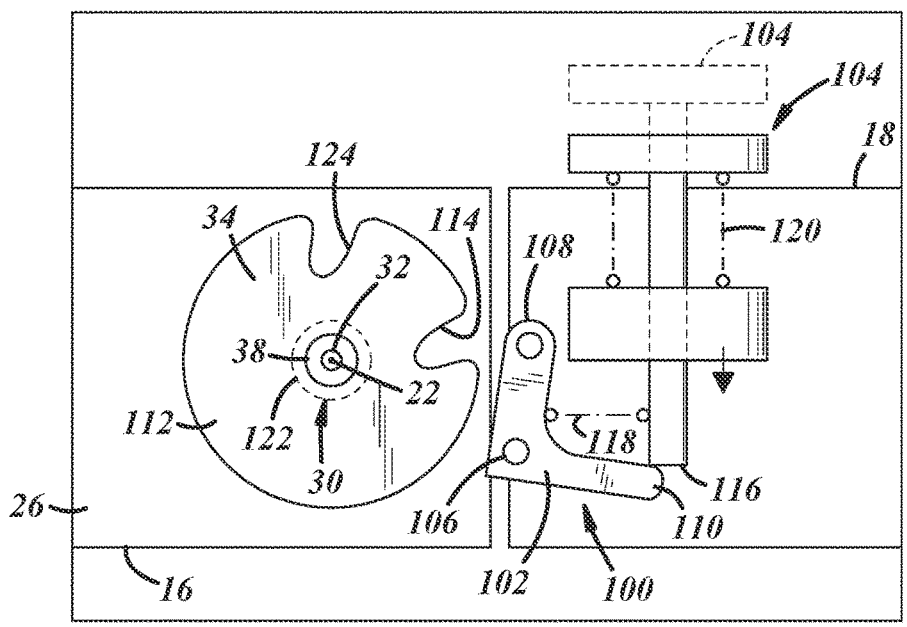
FIG. 13 is a bottom view of the ladder showing a retainer that holds the ladder in the retracted position.

In at least some implementations, the ladder 10 includes a retainer that holds the ladder 10 in the retracted position when use of the ladder 10 is not needed. The retainer may include a push-push mechanism that both is released and latched by pushing on part of the mechanism. One embodiment of a first retainer 40 is shown in FIGS. 7 and 8, and another embodiment of a first retainer 100 is shown in FIG. 13. Conveniently, the pushing action may be accomplished with a user's foot, to release the ladder 10 and permit the ladder to move to the extended position for use, and after use of the ladder, to then re-latch the retainer 40 to hold the ladder in the retracted position. The ladder 10 may also include a second retainer 42 (FIGS. 9-12) that holds the ladder 10 in the extended position for increased stability of the ladder 10 and to reduce or prevent pivoted movement of the ladder 10 when in use in the extended position. In the implementation shown in FIGS. 1-6 and 13, the retainer and mount 30 are located at the same end or side of the base 16, and in the implementation shown in FIGS. 7-12, the retainer is adjacent to the opposite side of the base 16 from the mount 30, and the ladder in this example rotates in the opposite direction relative to the vehicle.

In FIGS. 7 and 8, the first retainer 40 has a first position in which part of the retainer 40 overlaps the base 16 when the base is in the retracted position, to prevent rotation of the base to the extended position. And the first retainer 40 has a second position in which the first retainer does not overlap the base 16 in the path of rotation of the base, or otherwise permits the base to be released from the first retainer, so that the base is rotatable from the retracted position to the extended position wherein the upper surface 14 is exposed for use as a step.

As shown in FIGS. 7 and 8, the first retainer 40 includes a latch having a link 44 that rotates about a pivot 46 such as may be defined by a pin or shaft 48 that couples the retainer to, for example, part of the vehicle 12. The link 44 rotates about the pivot 46 (e.g. the pivot 46 defines an axis of rotation 49 of the link 44), with the pivot shown as being adjacent to a first end 50 of the link 44, with a distal, second end 52 of the link 44 swinging about a circular path around the pivot 46. The link 44 is held in a retaining position by engagement of the link 44 with a stop surface 54 of the vehicle 12, which defines part of the first position of the first retainer 40. So that the link 44 is in this position by default, a spring 56 or other biasing member may yieldably bias the link 44 for rotation about the pivot 46 in a direction that causes the link 44 to contact the stop surface 54 (counterclockwise in the orientation shown in FIG. 3).

In at least some implementations, the latch has a second link 58 that is coupled at a first end 60 to the link 44 by a pivot 62 which may be defined by a pin or the like, and which defines an axis of rotation 63 of the second link 58. The second link 58 has a free end 64 spaced from the first end 60 and which extends outwardly from the second end 52 of the link 44 and into the path of travel of the base 16 of the ladder 10, at least when the second link 58 is in a retaining position which defines part of the first position of the retainer 40, as shown in FIG. 7. So that the second link 58 is in this position by default, a second stop surface 68 may be provided to limit rotation of the second link 58 and the second stop surface 68 may be carried by or formed as part of the link 44, if desired.

In FIG. 8, the retainer 40 is shown in the second position in which the retainer 40 permits the ladder 10 to rotate away from the second link 58 and move to the extended position.

In at least some implementations, the second link 58 is positioned so that it's end 64 clears the adjacent end of the base when line 44 is rotated as shown, so that the base under the force of a biasing spring, rotates past the end 64 of link 58, from the retaining position shown in FIG. 7 to a release position, shown in FIG. 8. This may define part of the second position of the retainer 40, in which the retainer 40 permits the ladder 10 to rotate from the retracted position to the extended position.

In at least some implementations, the axis of rotation 63 of the second link 58 is between the axis of rotation 49 of the link 44 and the axis of rotation 22 of the ladder 10, and the second link 58 engages the base 16 between the pivot 46 of the link 44 and the axis of rotation 22 of the base 16. In at least some implementations, when the link 44 is rotated in a first direction the second link 58 rotates to the release position relative to the link 44 in a second direction opposite to the first direction. The link 44 may include an outer surface 70 that faces outward from the vehicle in the cross-car direction of the vehicle, and the outer surface 70 is accessible from outside the vehicle 12 so that the outer surface 70 may be engaged by a user (e.g. foot or hand) to push and rotate the link 44 inwardly toward the vehicle center (as shown in FIG. 8). This rotates the link 44 in the first direction, from the position the link 44 is in when the second link 58 is engaged with and retaining the ladder 10 in the retracted position. As shown in FIG. 7, when the retainer 40 is in the retaining position, the outer surface 70 of the link 44 may extend outwardly beyond an outer surface 20 of an adjacent portion of the vehicle 12 (which may include a component attached to the vehicle like a running board 18) so that the outer surface 70 of the link 44 is easier to access and actuate, if desired.

When the retainer 40 is in the retaining position, rotation of the link 44 relative to the ladder 10 moves the retainer 40 from the retaining position (FIG. 7) to a second, released position (FIG. 8) to permit the ladder 10 to rotate past the second link 58. That is, pushing the link 44 causes the second link 58 to rotate out of the path of movement of the base 16, to permit the ladder 10 to rotate to the extended position. In this position, the second link 58 does not overlap the base 16 and does not prevent movement of the base 16 toward the extended position. In the example shown, the first direction is clockwise, and the base 16 rotates in the first direction from the retracted position to the extended position, the link 44 rotates in the first direction to release the base (e.g. as the retainer 40 is moved from the retention position to the release position) and the second link 58 rotates in an opposite, second direction (e.g. counterclockwise) to release the base.

After the retainer 40 is moved to the second position and released from the ladder 10, the ladder 10 may rotate or be rotated to the extended position, shown in FIG. 2. The ladder 10 may be rotated by the user, by a spring or by a powered actuator 72 (FIG. 7), such as either a rotary or linear actuator. In this regard, the retainer 40 may be released by a user pushing the link 44, as earlier described, or by a powered actuator 72 which may move a single (e.g. a simple linear plunger or rotatable/pivoting latch) or multi-component retainer into and out of the path of movement of the ladder 10, to retain the ladder in the retracted position. The ladder may be returned to the stowed position by pushing the ladder and rotating it back (counterclockwise as viewed in FIGS. 7 and 8) until the ladder engages the second link 58 and rotates the link 58 away from the second stop 68, and out of the path of the base. When the base clears the second link 58, the second link may reset against the second stop surface and be retained thereby in the path of rotation of the base, in the retained position shown in FIG. 7.

In at least some implementations, the second retainer 42 is provided to hold the ladder 10 in the extended position, and inhibit or prevent rotation of the ladder 10 relative to the vehicle 12 when the ladder is in the extended position. This improves the stability of the ladder 10 when a user is standing on it.

Figure 10:
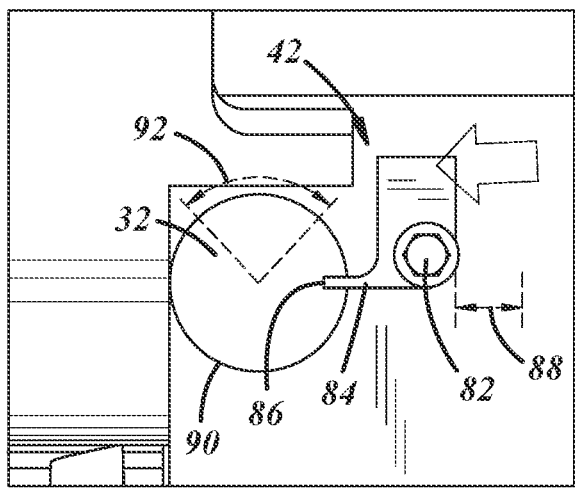
FIG. 10 is an enlarged fragmentary view of a second retainer that releasably holds the ladder in the deployed position.
Figure 11:
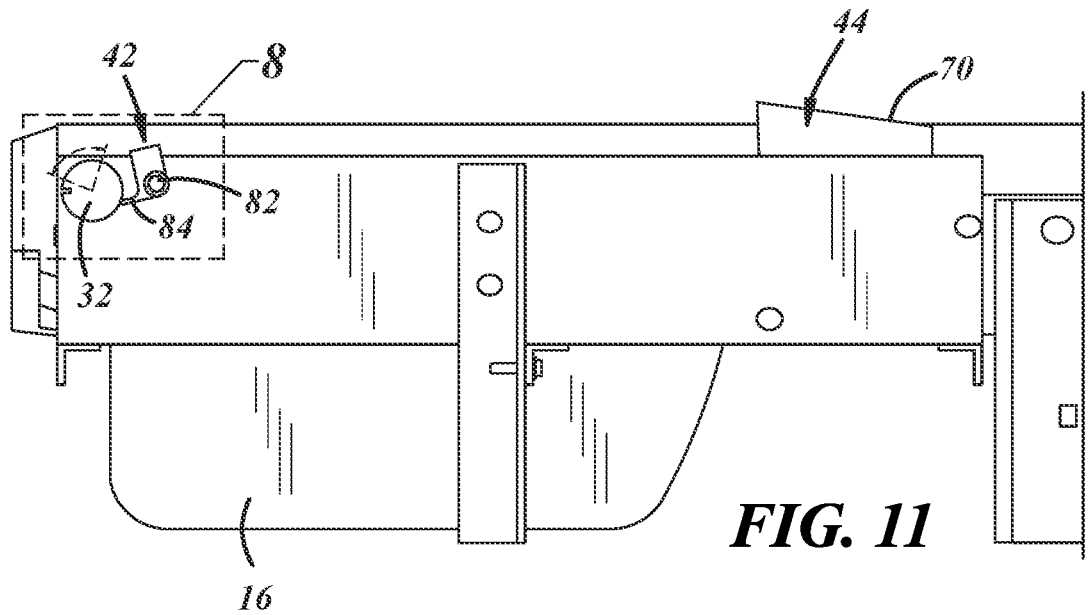
FIG. 11 is a bottom view of the ladder shown in the retracted position.
Figure 12:
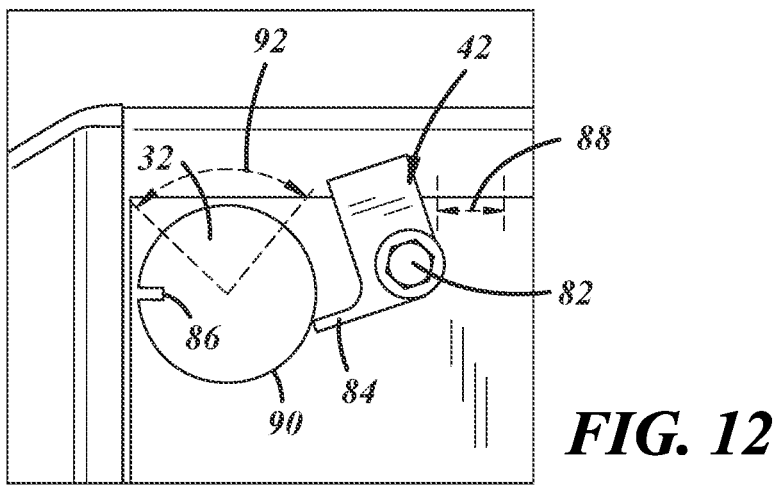
FIG. 12 is an enlarged fragmentary view of the second retainer when the ladder is in the retracted position.

FIGS. 9-12 show one implementation of a second retainer 42 that rotates about a pivot 82 (e.g. a pin or the like that defines an axis of rotation) between advanced and retracted positions. The second retainer 42 includes a finger 84 that is selectively engaged with part of the ladder 10, such as by being received within a void, which may be a slot 86, in part of the base 16 or the mount 30, where such part of the base or mount 30 rotates when the ladder 10 rotates so that the slot 86 moves relative to the finger 84. In the example shown, the mount 30 includes or is defined by a cylindrical shaft 32 about which the ladder 10 rotates, and the slot 86 may be formed in the shaft 32, such as in an end that extends out of the socket 38, or within an opening or void in the bracket 34 that exposes the shaft 32 and slot 86. The second retainer 42 may be yieldably biased by a spring 88 toward the advanced position so that the finger 84 is engaged with an exterior surface 90 of the mount 30 to which the slot 86 is open. When the ladder 10 rotates to a position in which the slot 86 is aligned with the finger 84, the second retainer 42 rotates under the force of the spring 88 and the finger 84 is received within the slot 86, as shown in FIG. 10. So arranged, the second retainer 42 inhibits or prevents rotation of the ladder 10 and holds the ladder 10 in the extended position. The slot 86 may be radially oriented, or within 30 degrees of radial, relative to the axis of rotation 22 of the ladder 10.

To release the finger 84 from the slot 86, the second retainer 42 may be manually released by rotating the second retainer 42 to remove the finger 84 from the slot 86, or the ladder 10 may be pushed farther in the first direction (e.g. farther away from the retracted position) until the slot 86 is sufficiently misaligned with the finger 84 and the finger is no longer within the slot 86, and then rotating the ladder 10 back toward the retracted position at a speed or rate that prevents the finger 84 from being received within the slot 86. Such rotation of the ladder 10 may be done by the user, by a spring 92 or other biasing mechanism that tends to rotate the ladder away from the extended position, or by a powered actuator, as desired. The second retainer 42 may be moved manually or by a powered actuator, as desired.

FIG. 13 shows one implementation of a first retainer 100 including a latch 102 and a release 104. The release includes a plunger 104 that is supported, e.g. by the vehicle, for slidable movement relative to the latch 102 which may also be supported by the vehicle so that the base moves relative to the latch 102 and plunger 104. The latch 102 is shown as an L-shaped link coupled to a pivot 106 between a first end 108 and a second end 110. In a first position of the latch 102, the first end 108 selectively engages or is within a path of movement of the base 16 to retain the base in the stowed position (e.g. inhibit movement of the base 16 out of the stowed position). In at least some implementations, the base 16 has or carries a surface or latch body 112 with a notch 114 in which the first end 108 of the latch 102 is received when the base 16 is in the stowed position and the retainer 100 is in a first position.

To release the base 16, the latch 102 is rotated away from the first position which moves the first end 108 out of the notch 114. To rotate the latch 102 and release the base 16, the plunger 104 is slidably displaced from a first position (shown in dashed lines in FIG. 13) to a second position as shown in FIG. 13, and in this movement an end 116 of the plunger 104 engages the latch 102 between the pivot 106 and the second end 110 (or at the second end 110), which rotates the latch 102 about the pivot 106, and removes the first end 108 of the latch 102 from the notch 114. The latch 102 may be biased by a spring 118 to the first position so that, upon release of the plunger 104, the latch 102 rotates back to the first position. The plunger 104 could also be biased by a spring 120 to its first position so that, upon release of the force on the plunger 104, the plunger 104 returns to its first position. The base 16 may also be acted upon by a spring 122 (which may be a torsion spring or other spring) so that, upon removal of the latch 102 from the notch 114, the base 16 is rotated by the spring 122 out of the stowed position. In this way, the base 16 automatically rotates away from a side of the vehicle so that that ladder 10 is easily accessible, and the base 16 is rotated away from the latch 102 so that when the latch 102 rotates back to its first position under the force of spring 118, the ladder 10 is not relatched in the stowed position. With the base 16 released from the retainer 100, the ladder may be unfolded for use, as set forth below.

To return the base 16 to the stowed position, the base 16 may be rotated against the force of the spring 122 back to the stowed position. During this movement, the latch body 112 is rotated relative to the latch 102 until the first end 108 of the latch 102 becomes realigned with the notch 114 and the spring force on the latch 102 causes the first end of the latch 102 to enter the notch 114 and thereby retain the base 16 in the stowed position. The base 16 may be pushed to rotate it about its pivot and return it to its latched position, and the plunger 104 may be pushed to release the base 16 from the latched position, which provides a simple push to release and push to lock system which is easy to operate by a person standing outside the vehicle. For example, the plunger 104 and the base 16 may both be pushed by a user's foot to effect the release and latching of the base 16 and ladder 10.

In the example of FIG. 13, a second notch 124 could be provided in the latch body 112 that is aligned with the first end 108 of the latch 102 when the base 16 is in the extended position. This second notch 124 and the latch 102 can be considered a second retainer, which functions like the second retainer 42 described above. To release the first end 108 of the latch 102 from the second notch 124, the plunger 104 can be advanced to or toward its second position so that the plunger 104 engages and displaces the latch 102, permitting the base to rotated relative to the latch 102 back toward the stowed position. In this way, the first retainer 100 can retain the base in both the stowed and advanced positions.

As shown in FIGS. 1-3, when the base 16 is in the stowed position and when the base 16 is initially rotated out of its stowed position, the ladder 10 is in a collapsed or folded position. FIGS. 4 and 5 show the ladder 10 being unfolded, and FIG. 6 shows the ladder in a fully unfolded position.

With reference to FIG. 6, the ladder 10 includes a support 126 having at least one step that is movable relative to the base when the ladder 10 is moved between the folded and unfolded positions. The support 126 includes at least one section, and may include multiple sections that are hinged or pivoted together to permit the folding and unfolding of the ladder 10.

A first section 128 of the support 126 includes spaced apart side rails 130 that are each connected to the base 16 at a first end 132 about a first pivot 134, where this first pivot 134 may include different pivot points for each side rail 130 (that is, the side rail pivots at the base may collectively be referred to as the first pivot). In implementations with a support that has only one section, one or more steps are secured to the side rails at a location or locations spaced from the first pivot.

In implementations with a support 126 that includes multiple sections, a second section 136 is coupled to the first section 128 at a location spaced from the first pivot 134. The second section 136 may also include spaced apart side rails 138, and these side rails 138 may be coupled the side rails 130 of the first section 128 at a second pivot 140, so that the second section 136 may rotate relative to the first section 128. Additional sections may include side rails coupled to the adjacent sections at additional pivots, as desired. The example shown includes a third section 142 that is the uppermost section of the ladder 10 when it is extended, as shown in FIG. 6. The third section 142 may include side rails 143 that define part of the support 126, and may be coupled to the second section 136 at a pivot 144. In at least some implementations, the pivots are defined by pins extending into or through the side rails, although hinges or other mechanisms may be used, as desired.

One or more steps 146 are carried by the support 126 in a desired manner. A section of the support 126 may have no steps, one step or more than one step, as desired to provide a desired distribution of steps 146 along the ladder 10. Further, a top section of the ladder 10, which is the third section 142 in the example shown, may include a cross member 148 that, in at least some implementations, is not intended to be stepped upon, but which may be leaned against to improve the balance of a person on the ladder 10. A handle 149 may be provided on the top section 142 to facilitate unfolding the ladder 10.

In the folded position of the ladder 10, the ladder section(s) 128, 136, 142 may be rotated about the pivots 134, 140 and 144 so that the sections are generally parallel to the upper surface 14 of the base 16. This provides a compact, low-profile ladder that may be stored at least partly beneath the vehicle and consume a minimum height beneath the vehicle.

In at least some implementations, in the folded position as shown in FIGS. 2 and 3, the first section 128 may be the top section of the ladder 10, with additional sections 136, 142 of the ladder 10 positioned beneath the first section 128. In the example shown, the sections 128, 136, 142 are arranged in the folded position with the first section 128 on top and the second section 136 that is on top of the third section 142, where the third section 142 is the closest to the ground. The sections 128, 136, 142 are connected together so that the first section 128 rotates relative to the base 16 about the first pivot 134 in a first direction (clockwise as viewed in FIGS. 4-6), the second section 136 rotates relative to the first section 128 about the second pivot 140 in the first direction, and the third section 142 rotates relative to the second section 136 about the third pivot 144 in an opposite, second direction (counterclockwise as viewed in FIGS. 4-6). A stop member 151, such as a post, may be provided to engage and limit counter rotation of the third section 142, if desired, as a user may provide a force in that direction when climbing up the ladder.

In at least some implementations, to inhibit unintended folding of the ladder 10, retainers are provided to hold the ladder sections 128, 136, 142 in their upright, unfolded positions. A first ladder retainer 150 may be provided between the base 16 and first section 128, a second ladder retainer 152 may be provided between the first and second sections 128, 136, and a third ladder retainer 154 may be provided between the second and third sections 136, 142.

The retainers 150, 152, 154 may be simple ball-detent mechanisms that seat and unseat under a certain force, or they may include pins carried by one section and selectively received in an opening of an adjacent section to releasably couple the sections together. The pins may be threaded and rotatable (e.g. by manually rotating associated handles as shown) to tighten/loosen the connection between sections 128, 136, 142, if desired. The retainers may be movable relative to the support from a secured position in which movement of the support (or a section thereof) is inhibited to an unsecured position in which the support (or a section thereof) may be more freely moved about the first pivot.

In at least some implementations, as shown in FIG. 1, the ladder 10 may be coupled to the vehicle 12 along a side of the vehicle and between front and rear wheels on a side of the vehicle. When in the retracted or stowed position, the ladder 10 may be received fully between the front and rear wheel. Of course, the ladder may be located in a different location, as desired, including between a rear wheel and rear end of the vehicle, beneath a front bumper or fasica of the vehicle, or near or under a rear bumper or fascia of the vehicle.

Figure 14:
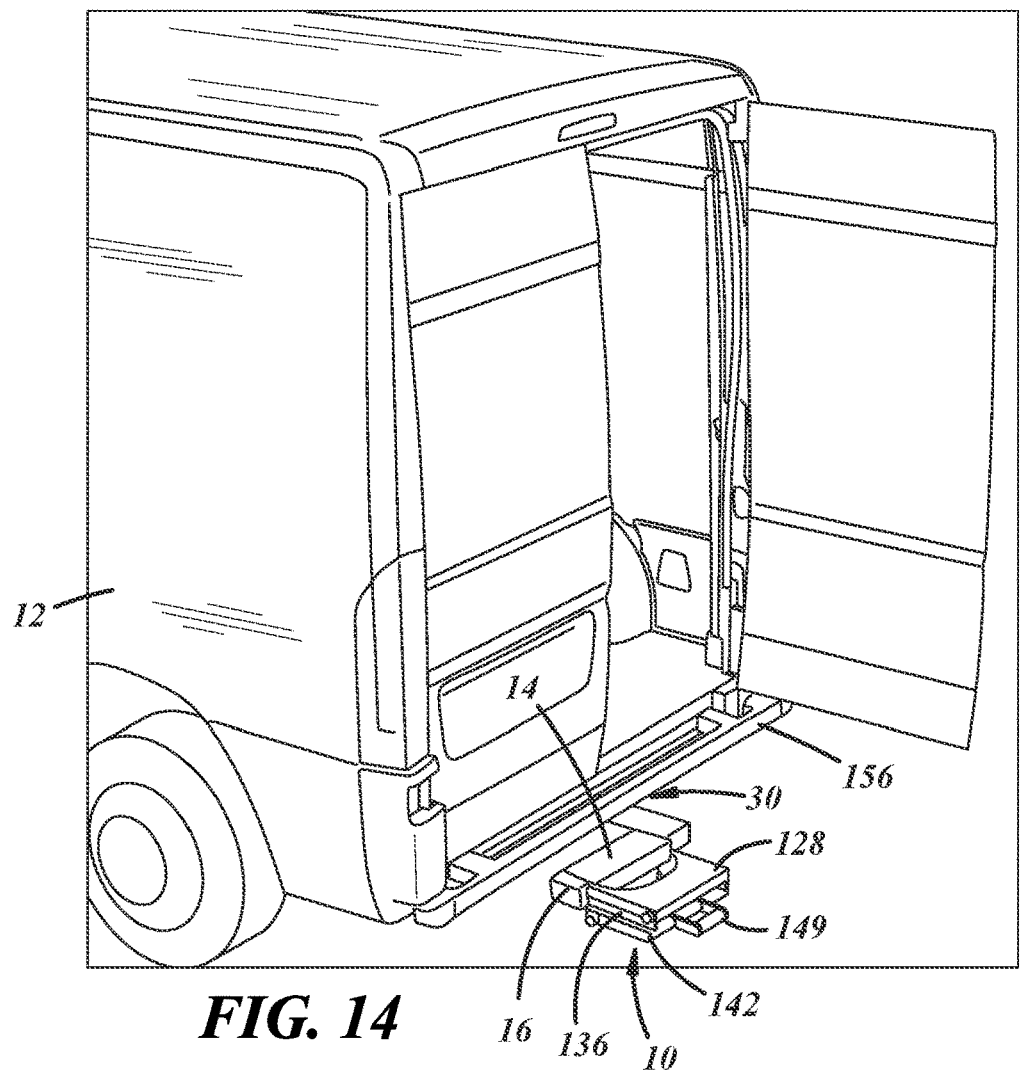
FIG. 14 is a perspective view of a rear of a vehicle including a ladder beneath a rear bumper, and with the ladder shown in the deployed and folded position.
Figure 15:
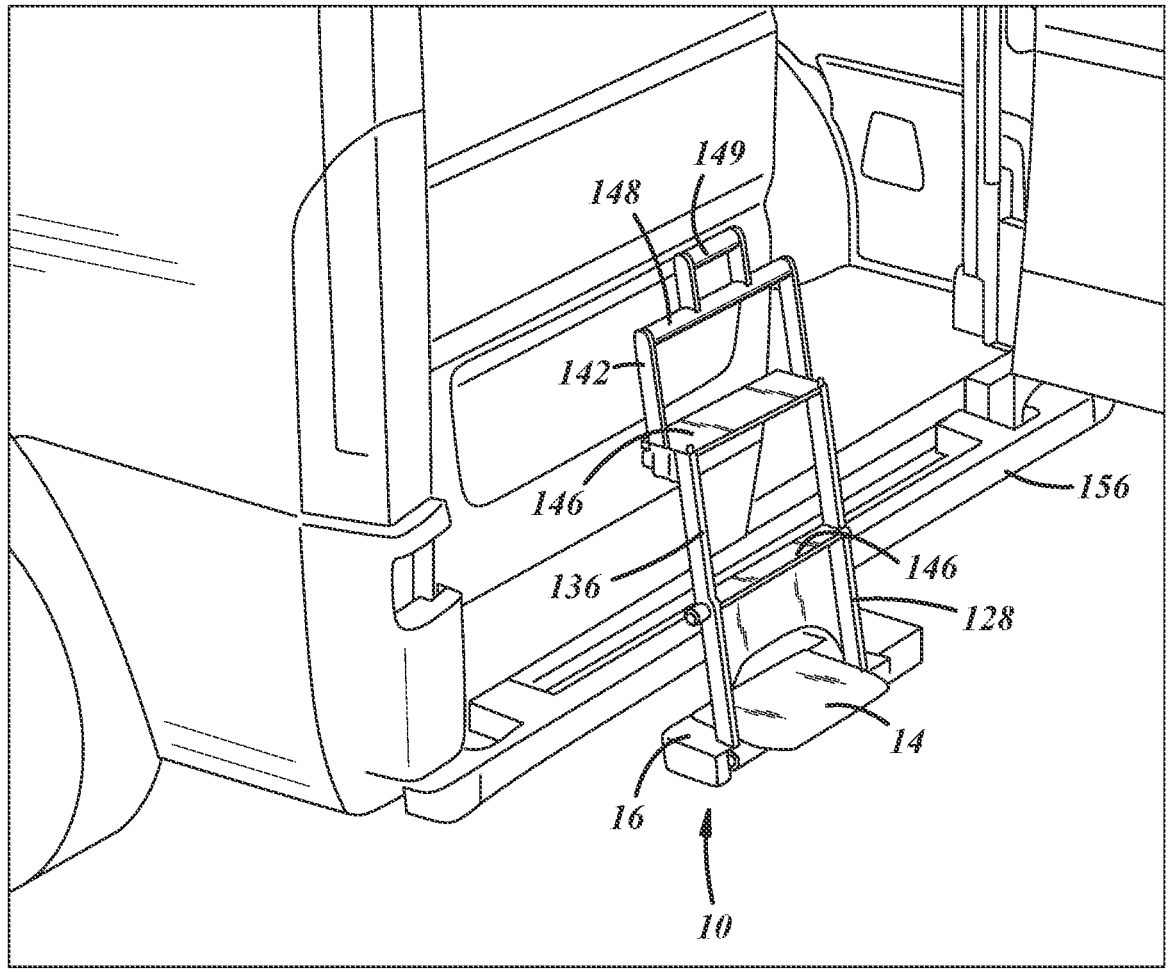
FIG. 15 is a view similar to FIG. 14 showing the ladder in the extended position.

FIGS. 14 and 15, illustrate an embodiment of the ladder 10 wherein the mount 30 is coupled to an underside of the vehicle 12, or an underside of a rear bumper 156 of the vehicle or to a trailer hitch coupled to the vehicle. The ladder 10 and related components like the first retainer 40 may be constructed in the same manner as previously described. In the example shown, the ladder, when in its extended position, is parallel to a side of the vehicle, shown as the rear of the vehicle in FIGS. 14 and 15. The ladder could instead be oriented at a different angle, such as but not limited to, perpendicular to the adjacent side of the vehicle as shown in FIGS. 1-6.

What is claimed is:

1. A stowable ladder for a vehicle, comprising:
    a base having an upper surface and a mount adapted to be coupled to a vehicle and defining an axis of rotation of the base, wherein the axis of rotation of the base is perpendicular to the upper surface of the base and the base rotates about the axis of rotation between an extended position and a retracted position;
    a support coupled to the base at a first pivot;
    at least one step coupled to the support, the support being movable about the first pivot between a folded position and an unfolded position, wherein the axis of rotation of the support about the first pivot is perpendicular to the axis of rotation of the base and the at least one step is farther from the base when the support is in the unfolded position than when the support is in the folded position; and
    a retainer having a first position in which the retainer overlaps one or both of the base and the support in a path of rotation of the base to prevent rotation of the base from the retracted position to the extended position, and the retainer has a second position in which the retainer does not overlap either the base or the support in the path of rotation of the base so that the base is rotatable from the retracted position to the extended position.

2. The stowable ladder of claim 1 wherein the support includes a first section and a second section coupled to the first section at a second pivot, wherein the axis of rotation of the second section about the second pivot is parallel to the axis of rotation of the first section.

3. The stowable ladder of claim 2 wherein the first section rotates in a first direction when the support is moved from the folded position to the unfolded position, and the second section rotates in the first direction when the support is moved from the folded position to the unfolded position.

4. The stowable ladder of claim 3 wherein, when the support is in the folded position, the second section is located beneath the first section, and when the support is in the unfolded position, the second section is above the first section, where above and below are relative to a ground surface that is below the base.

5. The stowable ladder of claim 2 wherein the at least one step includes a first step and a second step, and when the support is in the unfolded position, the first step is between the upper surface of the base and the second step.

6. The stowable ladder of claim 5 wherein the first step is carried by the first section and the second step is carried by the second section.

7. The stowable ladder of claim 2 wherein, when the support is in the unfolded position, part of the second section overlaps part of the first section and a ladder retainer is carried by either the first section or the second section and is securable to the other of the first section and the second section to inhibit pivoted movement of the second section relative to the first section.

8. The stowable ladder of claim 1 which also includes a ladder retainer carried by the base, the ladder retainer is movable relative to the support from a secured position in which movement of the support about the first pivot is inhibited to an unsecured position in which the support may be more freely moved about the first pivot.

9. The stowable ladder of claim 1 which also includes a spring that yieldably biases the base toward the extended position.

10. The stowable ladder of claim 1, wherein the retainer includes a first link and a second link, with the second link coupled to the first link by a pivot and having a free end that extends outwardly from the first link and into the path of travel of the base when the first link is in a retaining position and which rotates relative to the first link and away from the retaining position to a release position to permit the base to rotate to the extended position.

11. The stowable ladder of claim 1 wherein the retainer includes a latch having a first end and a second end, the latch rotating about a latch pivot located between the first end and the second end, and wherein the retainer includes a latch body carried by the base so that the latch body rotates relative to the latch when the base rotates, and wherein the latch body includes a notch that releasably receives the first end of the latch to define the first position of the retainer.

12. The stowable ladder of claim 11 which includes a release that is selectively engageable with the latch to move the retainer to the second position by rotating the latch about the latch pivot to remove the first end of the latch from the notch.

13. A stowable ladder for a vehicle, comprising:
a base having an upper surface and a mount defining an axis of rotation of the base, wherein the axis of rotation of the base is perpendicular to the upper surface of the base and the base rotates about the axis of rotation between an extended position and a retracted position;
a support having a first section that is coupled to the base at a first pivot, and the support has a second section that is coupled to the first section at a second pivot that is spaced from the first pivot, the support having a folded position in which the first section and second section are overlapped with each other and arranged near the base, and the support has an unfolded position in which the first section extends away from the base at an angle of between 45 degrees and 90 degrees relative to the upper surface, and the second section is parallel to the first section or within 30 degrees of parallel to the first section, and wherein the support includes at least one step that is spaced from the upper surface of the base when the support is in the unfolded position; and
a retainer having a first position in which the retainer overlaps one or both of the base and the support in a path of rotation of the base to prevent rotation of the base from the retracted position to the extended position, and the retainer has a second position in which the retainer does not overlap either the base or the support in the path of rotation of the base so that the base is rotatable from the retracted position to the extended position.

14. The stowable ladder of claim 13 wherein the axis of rotation of the second section about the second pivot is parallel to the axis of rotation of the first section about the first pivot.

15. The stowable ladder of claim 13 wherein the axis of rotation of the first section about the first pivot is perpendicular to the axis of rotation of the base.

16. The stowable ladder of claim 13 which also includes a second retainer that engages a stop surface when the base is in the extended position to releasably retain the base in the extended position.

17. The stowable ladder of claim 13 wherein, when the support is in the unfolded position, part of the second section overlaps part of the first section and a ladder retainer is carried by either the first section or the second section and is securable to the other of the first section and the second section to inhibit pivoted movement of the second section relative to the first section.

18. The stowable ladder of claim 13 wherein, when the support is in the folded position, the second section is located beneath the first section, and when the support is in the unfolded position, the second section is above the first section, where above and below are relative to a ground surface that is below the base.

* * * * *